United States Patent [19]
Brown

[11] 3,914,102
[45] Oct. 21, 1975

[54] APPARATUS FOR FOLDING CONTAINER RIMS

[76] Inventor: Gaylord William Brown, Beaverton, Mich.

[22] Filed: Sept. 16, 1974

[21] Appl. No.: 506,406

[52] U.S. Cl. ............ 425/392; 425/397; 264/297; 264/310; 264/319
[51] Int. Cl.² .................... B29C 17/02; B29D 7/22
[58] Field of Search ........... 425/285, 329, 367, 384, 425/340, 391, 392, 397, 402, 412, 148, 305

[56] References Cited
UNITED STATES PATENTS

| | | |
|---|---|---|
| 3,337,919 | 8/1967 | Brown .............................. 425/391 |
| 3,339,005 | 8/1967 | Brown et al. .................. 425/384 X |
| 3,355,536 | 11/1967 | Midgley et al. ................. 425/340 X |
| 3,548,457 | 12/1970 | Kulig................................ 425/392 |

*Primary Examiner*—J. Howard Flint, Jr.
*Attorney, Agent, or Firm*—John J. Swartz

[57] ABSTRACT

Apparatus for folding lips or rims of plastic containers provided on individual containers of a stack of nested containers comprising a rim folding roller having a plurality of spiral rim folding grooves therein for receiving and folding the heated rims, the rim folding roller being angularly offset relative to the axis of the stack such that the portions of the grooves receiving the rims lie in planes perpendicular to the axis of the stack.

13 Claims, 13 Drawing Figures

APPARATUS FOR FOLDING CONTAINER RIMS

BACKGROUND OF THE INVENTION

This invention relates to an apparatus for folding the rims of plastic containers arranged in nested relation at a rapid rate.

In the manufacture of polystyrene, polyethylene and other plastic containers such as disposable cups, bowls and the like, the containers are molded in a sheet of plastic material. When the containers are cut out of the plastic web, circumferential flanges or rims extend about the container mouths and present sharp edges. Apparatus has been provided heretofore for curling or rolling the rims of such containers when they are stacked in nested relation.

In rim curling apparatus of the type disclosed in U.S. Pat. No. 3,337,919 granted Aug. 29, 1967, the stack of containers must rotate at a very high velocity. With the prior art machine, in order to increase the output, it is necessary to increase the rotational speed of the stack. If the rotational speed of the stack exceeds a predetermined speed, i.e. 2000 r.p.m. it becomes difficult to control the position of the stack during rotation. Accordingly, it is an object of the present invention to provide container rim folding apparatus which will increase the output while maintaining the rotational speed of the stack at a controllable level.

It is another object of the present invention to provide rim folding apparatus having a grooved rim folding member for folding the rims of containers which are arranged in stacked relation whereby the output of the machine is increased although the rotational speed of the stack is decreased.

Apparatus constructed according to the present invention and disclosed in applicants copending patent application Ser. No. 506,322, filed in the U.S. Patent Office on Sept. 16, 1974, entitled Lip Folding Apparatus, incorporated herein by reference, employs a rotatable rim folding member having a plurality of spiral grooves about the periphery thereof for receiving the rims on successive containers provided in a stack of containers. The helix angle of the multiple flights which define rim receiving, rim folding grooves is larger than the helix angle which can be accomodated on a single groove, rim folding member. Accordingly, it is another object of the present invention to provide apparatus of the type described having a rim folding member provided with a plurality of flights defining multiple, rim receiving, rim folding grooves about the peripheral surface thereof.

In the prior art machines, the rotational axis of the rim folding member is parallel to the axis of the stack. The prior art rim curling members incorporate compression zones at the lead ends of the grooves for partially compressing the rims so that they will become entrapped within the spiral grooves. In at least one prior machine, rim curling is not completed until the container has rotated through more than one revolution after the rim is received in the rim curling zone. Thus, at least part of one container revolution is required to partially compress the rims to a width that can be received in the grooves. The apparatus constructed according to the present invention folds the rim within only one revolution of the rim after being received in the groove and incorporates a rim folding member which is angularly off-set relative to the rotational axis of the stack such that the portions of the grooves which receive the rims lie in planes substantially perpendicular to the axis of the stack. This construction eliminates the necessity for compression zones and thereby minimizes the machining attendant to a rim curling member having such a compression zone. This construction also accelerates the time required to complete rim formation after the rim contacts the rim forming member and thus there is less cooling time prior to rim formation. In the present apparatus, the rim folding member contacts the rim for a much shorter time prior to bead completion and thus plastic sheet temperature is less critical. Accordingly, it is a further object of the present invention to provide rim folding apparatus having a rotatable, rim folding member in which the rim folding groove has substantially the same cross sectional area throughout the length thereof.

It is another object of the present invention to provide rim folding apparatus in which the temperature of the plastic sheet is less critical.

It is still another object of the present invention to provide apparatus of the type described in which the containers are fed mouth first to the rim folding member.

Yet another object of the present invention to provide apparatus of the type described which can incorporate a smaller diameter rim folding member.

Prior art lip curling machinery has incorporated a plurality of arcuately arranged, polished, stainless steel or chromium plated crowding rolls spaced about the grooved curling member for forcing the rims into the curling groove on the curling member. The prior crowding rolls, which were disposed substantially parallel to the axis of the container stack, were driven and highly polished to minimize the resistance to axial movement of the stack as it passed axially through the rim curling member. It is an object of the present invention to provide a machine of the type described employing a plurality of compressing rolls, arcuately arranged about the rim curling roller for receiving the container and maintaining the rim in the groove, which permit substantially uninhibited axial movement of the containers.

It is another object of the present invention to provide rim folding apparatus of the type described wherein the compressing roller members need not be highly polished.

Another object of the present invention is to provide a machine of the type described which can be angularly adjusted to a vertically inclined position, such that gravity will aid of the feed of the stack through the apparatus.

These and other objects of the present invention will become apparent to those of ordinary skill in the art as the description thereof proceeds.

SUMMARY OF THE INVENTION

Apparatus for folding radially projecting rims or flanges provided on individual containers of a stack 6f containers or the like comprising mechanism for heating the container rims to a deformable state; a rotatable, rim folding roller means, having at least one spiral rim folding groove for receiving and folding the heated rims, and compressing mechanism arcuately arranged about a peripheral portion of said rim folding roller means for receiving said container and maintaining said rims in the groove, under such force as to effect conjoint rotation and relative axial movement of the containers and the roller means, and mechanism mounting said roller means angularly offset relative to the axis of said stack such that the portion of said groove receiving the rims lies in a plane perpendicular to the axis of the stack.

The present invention may more readily be understood by reference to the accompanying drawing in which:

FIG. 12A is a sectional side view of the feed rolls of a slightly modified construction.

Figure 1:
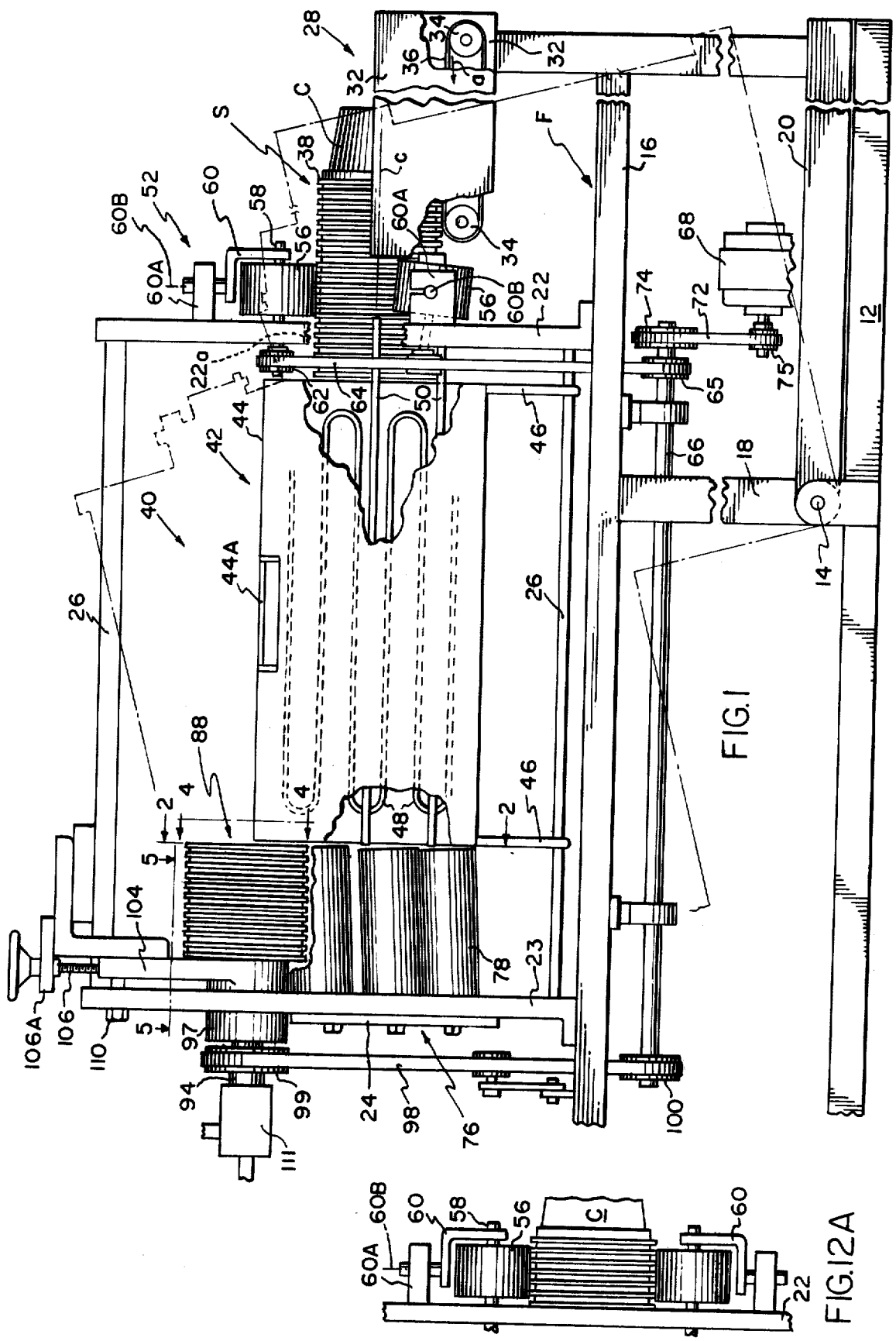
FIG. 1 is a side elevational view of apparatus constructed according to the present invention, part of the apparatus being broken away to better illustrate other portions thereof.

Apparatus constructed according to the present invention is mounted on a frame, generally designated F, pivotally mounted on a base 12 via a pivot pin 14. The frame F includes a horizontal bed 16 mounted on upstanding posts 18 spanned by horizontal connecting bars 20 (FIG. 1).

A pair of axially spaced apart end frame member 22 and 23, mounted atop the bed 16, are spanned by stringers 26. A stack delivery conveyor, generally designated 28 is provided for delivering a stack, generally designated S, of containers C. The conveyor 28 is mounted atop the bed 16 and includes a pair of generally parallel, sidewalls 32, mounting rotable endrolls 34 around which is trained an endless drive belt 36 traveling in the direction of the arrow $a$.

The container C is a one piece, molded plastic member which is initially cut from a plastic web so as to provide a peripheral flange, web, or rim 38 about the open or mouth end of the container C. The nested containers are fed open end foremost. Apparatus constructed according to the present invention is provided for rolling or folding the rim 38 to provide a bead 38A (FIG. 9) which will have a folded edge. The conveyor unit 28 delivers the stack S of containers C to a heating station, generally designated 40, at which the rims 38 are heated to a deformable state. Mounted between the end frame members 22 and 24 is a heating unit, generally designated 42, which may be an electric heating unit of the type disclosed in U.S. Pat. No. 3,337,919 and U.S. Pat. No. 3,339,005, both incorporated herein by reference. As described in the aforementioned patents, the heating unit 42 includes two opposed, semi-cylindrical housing sections 44 pivotally mounted on the lower stringer 26 via pairs of arms 46. Each half section 44 includes a handle 44A by means of which the semi-cylindrical sections may be swung on the stringer 26 between spread positions and closed engaging positions enveloping a container stack S passing through the heating station 40. The half sections 44 are of such size as to receive and pass a stack S of containers C. A plurality of conventional, electrical resistance heating elements 48 are mounted on the inner-cylindrical surfaces of each half section 44 and may be connected to a suitable source of power such as 220 volt, 60 cycle alternating current. The longitudinal axis of the heating unit 42 is parallel to the axis $c$ of the stack S. A plurality of guide rods 50 span the frame members 22 and 24 to support and properly position the stack S as it passes through the heating section 42.

Apparatus, generally designated 52, is provided for axially forwarding or driving the stack S of nested containers C mouthfirst through the heating unit 42 and comprises three, equiangularly spaced, forwarding rolls 56, formed of soft rubber or the like, journaled on spindles 58 which are inclined to the longitudinal axis of the heating unit and the longitudinal axis $c$ of the stack. Each spindle 58 is journaled on a yoke 60 which is rotatable mounted on a bracket 60A for rotation about an axis 60B intersecting the stack axis $c$. The bracket 60A is mounted on the end plate 22 for radial adjustment toward and away from the stack axis. The supports 60 are spaced about a stack receiving opening 22a provided in the plate 22, but the rolls 56 project radially inwardly beyond the edge of the opening 22a so as to grip the peripheral edge portions presented by the container rims 38. The modification illustrated in FIG. 12A includes only a pair of diametrically opposed, angularly adjustable drive rolls 56 mounted identically to the rolls 56 and identical parts are identified with identical numerals. The spindles 58 are driven by a drive belt 64 trained around a pulley 62 fixed to the spindles 58 as well as a drive pulley 65 fixed to a shaft 66. The shaft 66 is driven by an endless drive belt 72 trained around a pulley 75 fixed to the output shaft of an electric motor 68, and a pulley 74 fixed to the shaft 66. The arrangement of the rubber covered drive rolls 56 is such that the inclination of the axes of rotation of the drive rolls 56 may be adjusted so as to control the rate at which containers C are rotated and fed to the heating unit 42.

Figure 2:
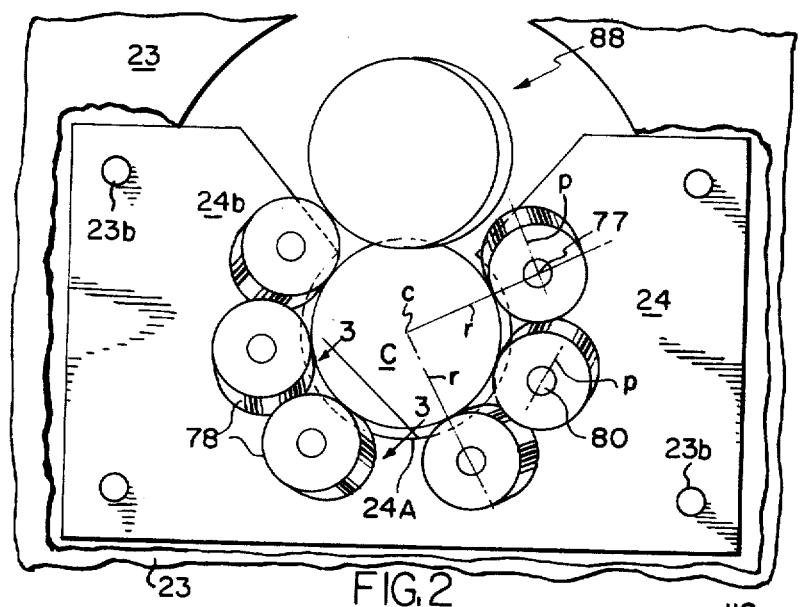
FIG. 2 is a sectional end view, taken along the line 2—2 of FIG. 1.
Figures 8, 9:
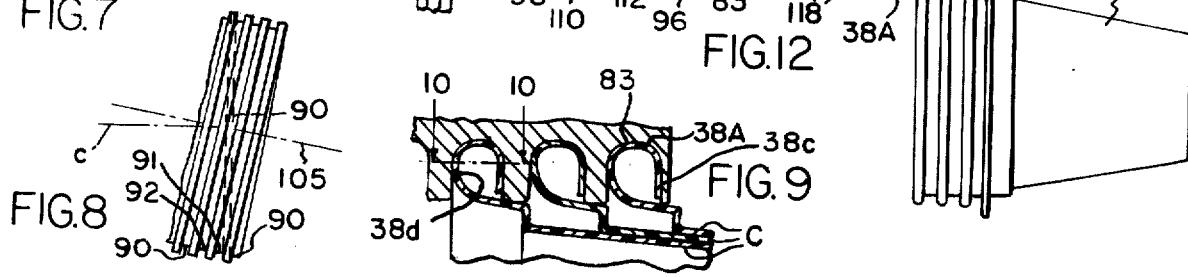
FIG. 8 is an enlarged fragmentary, top plan view of the axially inner end portion of the roller member illustrated in FIG. 5.
FIG. 9 is a greatly enlarged sectional side view illustrating the container rims in a folded state.

Apparatus, generally designated 76, is provided downstream of the heating station 42 for folding the container rims 38 over on themselves to the positions illustrated in FIG. 9. The apparatus 76 includes a mounting plate 24 spanning an opening 23a provided in the plate 23 and fixed to the plate 24 by bolts 23b. The apparatus 76 further includes a plurality of arcuately spaced, non-parallel, compressing roll members, generally designated 78, spaced about a smaller diameter opening 24a provided in the mounting plate 24. Each roll member 78 comprises a spindle 80 having a threaded end 81 that is accomodated in an opening formed in the end plate 24 and secured to the latter by a nut 82. Rotatably journaled on the spindle 80 via suitable bearings 84 are sleeves 86. The diameters of the sleeves 86 and their locations relative to the opening 24a are such that each roll member projects radially inwardly beyond the confines of the opening 24a so that at least the central roll portions 78A tangentially engage the container rims 38 as the containers C move axially. The sleeves 86 yave a substantially uniform external diameter throughout their length and the outer surfaces thereof need not be polished. Taken together the rolls 78 present a horseshoe appearance as is best illustrated in FIG. 2. Each inner bearing 84 is angularly offset and is received in a machined recess 86 on the inside surface 24b of the plate 24.

Figure 3:
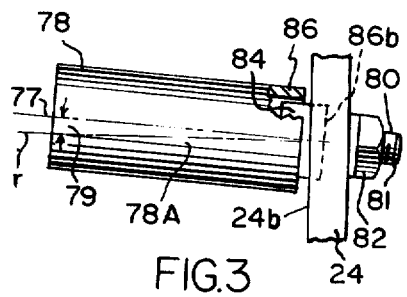
FIG. 3 is a fragmentary, sectional view, taken along the line 3—3 of FIG. 2.

The rolls 78 are angularly positioned relative to the axis c of the stack S such that the axes 77 of the rolls 78 like in planes p that are perpendicular to radial planes r intersecting the stack axis c, but are inclined relative to radial planes r by an angle 79 (FIG. 3). As viewed in FIG. 2, each roller 78 is identically angularly offset by an angle 79 which is particularly selected such that there is substantially no axial resistance by the rolls 78 to forward movement of the stack S.

Figure 12:
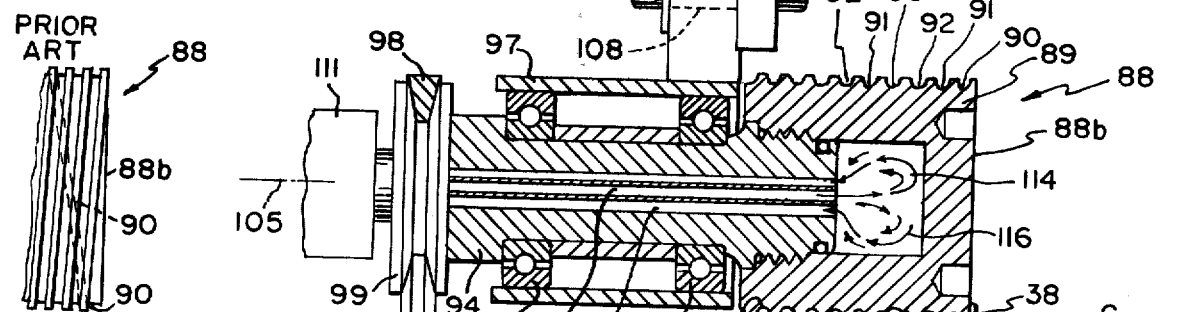
FIG. 12 is greatly enlarged, sectional, side view more particularly illustrating the mounting mechanism for the rim folding roll member.

The upper end of the end plate opening 24a is flared outwardly as illustrated at 24b in FIG. 2. Accomodated in the opening 24b at the upper open end of the horseshoe configuration presented by the rolls 78 is a grooved, rim folding member generally designated 88, having an external surface in which is formed a plurality of helical grooves 90, 91 and 92 of substantially uniform depth and width along the full length of the roll 88. The forming roll 88 includes a cylinder 89 secured to a spindle 94 journaled in bearings 96 mounted in a bearing housing 97 which is received in the end plate opening 23a and 24b. The spindle 94 is driven by an endless belt 98 (FIGS. 1 and 12) trained around a pulley 99 fixed to the spindle 94 and a pulley 100 fixed to the drive shaft 66. The bearing housing 97 is provided with a flange 104 that is vertically adjustable by means of an adjusting screw 106 journaled in a bearing block 106A and having threaded engagement with the flange 104. A bolt 109 (FIG. 12) is received in a slot 108 provided in the flange 104. A nut is provided on the bolt 106 for clamping the roll 89 in position. A pair of coaxial internal coolant passages 110 and 112 are provided in the spindle 94 for passing coolant fluid from a source 111 in the direction of the arrows 114 and 116 (FIG. 12).

Figures 4, 5, 6:
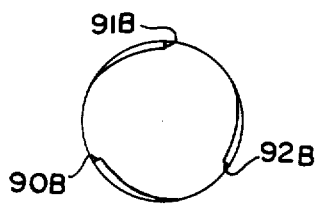
FIG. 4 is an end elevational view of the rim folding member taken along the line 4—4 of FIG. 1, more particularly illustrating the lead ends of the rim folding grooves.
FIG. 5 is the top plan, sectional view taken along the line 5—5 of FIG. 1, more particularly illustrating the rim folding member.
FIG. 6 is a underplan view of the rim folding roller member illustrated in FIG. 5.

The bracket 104 is positioned such that the rotational axis 105 of the rim folding cylinder 89 is not parallel to the axis c of the stack S but rather is angularly adjusted thereto in a horizontal plane at an angle 79 (FIG. 5) equal to the helix angle of the threads 90, 91, and 92. In this position, the portions of the lip folding grooves 90, 91 and 92 on the under side of the lip folding member 88 which receive the rims 38 like in parallel planes 107 which are right angles to the stack axis c as is best illustrated in FIG. 6. The terminal rim portions 38c tangentially engage the bases or roots 83 of the groove to be forcibly turned to a folded position as illustrated at 38A (FIG. 9). The screw flight portions which are immediately axially adjacent the tangentially engaged rim portions lie in planes which are perpendicular to the stack axis c.

The helix angle of the flights 118 forming the grooves 90, 91 and 92 is substantially greater than that of a single flight screw.

Figures 10, 11:
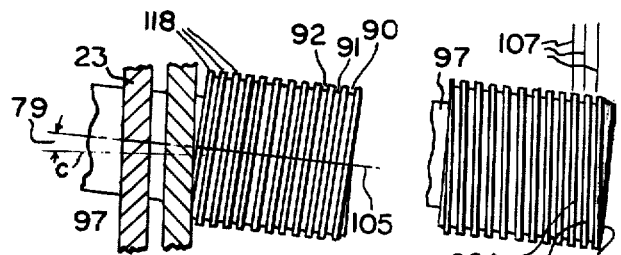
FIG. 10 is a sectional top plan view taken along the line 10—10 of FIG. 9.
FIG. 11 is a greatly enlarged sectional top plan view similar to FIG. 10 but more particularly illustrating the rim curling groove of the prior art rim curling member illustrated in FIG. 7.
Figure 7:
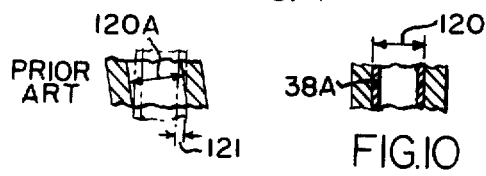
FIG. 7 is an enlarged, fragmentary, top plan view of a prior art rim folding roller member.

As is illustrated in FIG. 8, if the axis 105 of the rim folding member 88 is inclined to the stack axis c such that the rim receiving portions 90A, 91A, and 92A of the slots 90, 91, and 92 respectively lie in planes perpendicular to the stack axis c, the full slot width 120 (FIG. 10) is available for receiving the container rims 38 and thus the compression zones previously associated with such forming rolls can be eliminated. This construction also permits the compression rolls 78 to be of substantially constant diameter throughout the length thereof. As is illustrated in FIGS. 7 and 11, if the rim receiving slot portion lies in a plane which is not perpendicular to the stack axis, the effective slot width 120A is reduced by the axial width 121. The axial feed force required to entrap the rim 38 in a slot having a reduced effective width 120A is much greater. As is illustrated in chain lines in FIG. 11, the natural folded position of the rim 38 would overlap the sides of the forming grooves and thus in order to be received in and passed by the grooves, the rims must be distorted in the prior art machine. Because the rim compression roll 78 is positioned at an angle 79 relative to the axis c and the radial plane r, the compression rolls 78, which force the rims 38 into the slots 90, 91 and 92, are driven in such a paths that the rims 38 follow or trace helical paths on the rolls 78. The rolls 78 need not be polished since upon rotation of the rolls 78, the rolls 78 tend to forward the rims 38 forwardly and thus do not resist axially forward movement thereof.

OPERATION

In the operation of the apparatus, a stack S of nested containers C is fed to the machine by the conveyor 32 so as to pass through the end plate opening 22a open end foremost. The rims 38 are tangentially engaged by the drive rolls 56 with sufficient friction to rotate the containers C while concurrently forwarding them axially through the heating unit 42 where the flanges 38 are supported by the guide rods 50 and concurrently heated by the heating coils 48 to a softened state so as to be readily deformable. The angular positions of the forwarding rolls 78 can be adjusted to control the feed rate. From the heating unit 42, the containers C are driven forwardly by the drive rolls 56 to the space defined by the compressing rolls 78 and the rim folding member 88. As can be seen in FIG. 4, the lead ends 90B, 91B and 92B of the grooves 90, 91 and 92 at the innermost end 88b of the folding roll 88 are circumferentially spaced 120°. The position of the compression rolls 78 is such that the central portions 78A most securely grip the axially forwarded rims 38 however, due to radial compression of the rims 38 by the rolls 78 the rims 38 are gripped along an entire length of the rolls 78 to force the rims 38 into successive ones of the slots 90, 91 and 92 and to fold the rims 38 upon themselves as the containers are rotated to provide substantially uniform, rounded, peripheral beads 38A. Because the groove portions 90A, 91A and 92A receiving the rims 38 lie in planes substantially perpendicular to the axis c of the stack S, and because they are fed mouth first so that the flanges 38 easily buckle at the junction 38B, the containers C are not forced axially rearwardly by the flights 118 but rather, the flights 118 tend to turn the flanges 38 to a folded position so that the rims 38 easily enter the grooves.

There is a temperature range within which the container rims can be folded. In the prior art machines only very minor variations in container dimensions and container temperature could be tolerated. The adjustment of prior art machines is critical. Because the portions of the flights 118 receiving the rims are perpendicular to the stack axis c and the full width of the groove is available to initially receive and fold the rims, the machine can accept containers having a larger temperature tolerance.

As illustrated in FIG. 2, the container rim 38 and folding roll 88 tangentially engage with substantially line contact. Since the present construction eliminates the compression zone, the terminal rim portion 38c which tangentially engages the folding roll 88 is substantially immediately folded inwardly toward the sidewall to the position illustrated in FIG. 9 in which the terminal rim portion 38c overlies or axially confronts the rim portion 38d. Upon one completed rotation of a container rim 38 is received in one of the slots 90, 91 or 92 folding is complete and the beaded rim 38A will follow along the length of the groove to cool the heated rim 38A so that it will set in the folded position. The single stage folding eliminates the multi-stage, progressive curling of the rims. If desired, the frame F can be swung about the axis 14 to the position illustrated in chain lines in FIG. 1 so that gravity will aid the axial flow of containers to the rim curling zone.

In at least one prior art rim curling machine, the curling screw has a fairly large diameter to keep the helix angle small so that containers will travel axially past polished crowding rolls more easily. For a given set of circumstances smaller diameter rolls having a larger helix angle. With the rim folding member constructed and mounted according to the present invention, the diameter of the rim folding member may be decreased in comparison to the diameter of prior art curling roll members. Because the rim compressing rolls 78 are angularly offset as described instead of being parallel, they provide increased driving effort or force to the containers. This is advantageous because cup counting mechanism is generally utilized with machines of the type disclosed herein and is actuated or driven by the cups. The present invention provides increased axial drive force useful in actuating such mechanism, without slippage, so that an accurate cup count can be obtained.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

What I claim is:

1. Apparatus for forming deformable projecting rims or flanges provided on the sidewalls of individual containers of a stack of nested containers or the like comprising:
   a frame;
   means on said frame for heating the rims to a deformable state at a rim heating station;
   rim turning roller means, rotatable on said frame about an axis, having a plurality of spiral flights defining a plurality of spiral rim turning groove means about the peripheral surface thereof for receiving and turning the heated rims inwardly toward the sidewalls of successive containers at a rim turning station;
   means for rotating said rim turning roller means about its longitudinal axis and for rotating said stack about its longitudinal axis while concurrently axially forwardly feeding said stack through said heating and turning stations; and
   means for receiving said stack and maintaining said rims in said groove means as the containers move axially through said rim turning station to turn portions of radially inwardly said rims;
   said rim turning roller means being angularly offset relative to said longitudinal axis of said stack such that the portions of said spiral groove means receiving said rims lie in parallel planes perpendicular to the axis of said stack.

2. The apparatus as set forth in claim 1 wherein said means for maintaining said rims in said grooves comprises a plurality of arcuately arranged longitudinally extending, rotatable compressing members, downstream of said heating station, circumferentially spaced about said rim turning roller means a distance such as to receive said containers and maintain the rims in said groove means, said compressing members being rotatable about their respective longitudinal axes, and means counting said compressing members such that said compressing members are not parallel to each other and not parallel to the axis of said stack.

3. The apparatus as set forth in claim 2 wherein the longitudinal axis of each of said compressing members lies in a plane which is perpendicular to a radial plane intersecting said axis of said stack, said longitudinal axis of each compressing member being inclined at a predetermined angle relative to said radial plane.

4. The apparatus as set forth in claim 2 wherein said compressing members are freely rotatable, non-driven rolls.

5. The apparatus as set forth in claim 1 wherein said rim turning roller means comprises only one rim folding roller, the width and depth of said groove means remains constant throughout the length thereof.

6. Apparatus for forming a deformable projecting rim or flange on a container or the like having a longitudinal axis comprising:
   a frame;
   means on said frame for heating the rim to a deformable state at a rim heating station;
   rim turning roller means rotatable on said frame about an axis, having spiral, rim turning groove means for receiving and turning at least a portion of the heated rim radially inwardly at a rim turning station;
   means on said frame for rotating said roller means about its axis and said container about its axis while concurrently axially feeding said container in an axially forward path through said heating and turning stations; and
   a plurality of compressing rolls arcuately arranged about and radially spaced from a peripheral portion of said rim turning roller means for receiving said container and maintaining said rim in said groove means under such force as to effect rotation of said rolls;

said rolls being freely rotatable about their respective longitudinal axis which are not parallel to each other and are not parallel to the axis of said container.

7. The apparatus as set forth in claim 6 wherein said rolls are non-driven and the axis of said rim turning roller means is non-parallel to the longitudinal axis of the container.

8. The apparatus as set forth in claim 6 wherein said rim turning roller means comprises a rim folding roller, said groove means comprises a plurality of spiral grooves in said rim folding roller which have a substantially constant width and depth throughout their length of said rim folding roller.

9. The apparatus as set forth in claim 6 wherein the compressing members comprise a plurality of rotatable rolls each having a substantially uniform external diameter throughout its length.

10. Apparatus for folding a deformable projecting rim or flange of a container or the like having a longitudinal axis comprising:

a frame;

means on said frame for heating the rim to a deformable state at a rim heating station;

rim folding roller means rotatable on said frame about an axis, having spiral, rim folding groove means for receiving and folding the heated rim at a rim folding station;

means for rotating said rim folding roller means;

compressing means arcuately arranged about and radially spaced from a peripheral portion of said rim folding roller means for receiving said container and maintaining said rim in said groove means under such force as to effect conjoint rotation and relative axial movement of said container and said roller means; and means mounting said roller means angularly offset relative to said longitudinal axis of said container such that the portion of said groove means receiving said rims lies in a plane perpendicular to longitudinal axis of said container.

11. The apparatus as set forth in claim 10 including a base, and means mounting said frame for pivotal movement on said base about a horizontal axis to an inclined position in which said heating means is elevated relative to said rim folding roller means so that gravity aids the axial movement of said containers in a forward path.

12. The apparatus as set forth in claim 10 including a pair of diametrically opposed, rotatable feed rolls, upstream of said rim heating station, for tangentially engaging said containers to rotate and forward said container, and means adjustably mounting said opposed drive rolls such that the rotational axes of said opposed drive rolls are angularly adjustable to control the axial feed rate of said container.

13. The apparatus as set forth in claim 10 wherein the folding means fold the rim over on itself within one revolution of the container after the rim is received in said groove means.

* * * * *

UNITED STATES PATENT OFFICE
CERTIFICATE OF CORRECTION

Patent No. 3,914,102                    Dated  October 21, 1975

Inventor(s)  BROWN, GAYLORD WILLIAM

It is certified that error appears in the above-identified patent and that said Letters Patent are hereby corrected as shown below:

Column 4, line 66, change "24a" to -- 24A --.

Column 5, line 19, change "like" to --lie --.

Column 6, line 46, change "78" to -- 56 --.

In Claim 1, column 8, line 15; after "to", insert -- radially inwardly --.

In Claim 1, column 8, line 16; cancel "of radially inwardly".

In Claim 8, column 9, line 5, cancel "their" and insert -- the --.

Signed and Sealed this

Twenty-third Day of January 1979

[SEAL]

Attest:

RUTH C. MASON
Attesting Officer

DONALD W. BANNER
Commissioner of Patents and Trademarks